UNITED STATES PATENT OFFICE.

ALFRED ADAIR, OF TROYEVILLE, JOHANNESBURG, TRANSVAAL.

CYANID TREATMENT OF ORES.

No. 869,287.  Specification of Letters Patent.  Patented Oct. 29, 1907.

Application filed February 15, 1907. Serial No. 357,466.

*To all whom it may concern:*

Be it known that I, ALFRED ADAIR, a British subject, residing at 16ᴬ Overbeek street, Troyeville, Johannesburg, in the Colony of the Transvaal, have invented certain new and useful Improvements in the Cyanid Treatment of Ores, of which the following is a specification.

The present invention relates to the cyanid process for the extraction of metals from their ores, the object being to improve the efficiency of extraction and reduce the consumption of cyanid.

The invention broadly consists in employing with the cyanid solution and in the presence of alkali, a compound of manganese in which manganese dioxid occurs in a finely divided amorphous (as distinguished from the crystalline) state, more particularly raw umber, brownite or Weldon mud; with or without additional oxidizing agents as hereinafter noted. Thus in treating weathered pyritic gold ores, which usually contain much ferrous sulfate as well as free sulfuric acid and other substances injurious to cyanid, the ore is first rendered alkaline by the addition for instance of lime, whereafter the manganese compound, conveniently raw umber, is intimately mixed with the ore, which is then treated with cyanid in the usual manner. The quantity of umber or the like employed may be widely varied and roughly speaking the larger the quantity the better the extraction; as a working direction, however, it may be stated that when treating pyritic ore as aforesaid and using commercial raw umber, the proportion of the latter to the ore may vary from .25 per cent. to 4 per cent. according to the amount of ferrous salts occurring in the ore.

In the treatment by cyanid the manganese compound not only neutralizes the deleterious action of the cyanicids present, but it also operates independently to enhance the extractive capabilities of the cyanid and may therefore advantageously be employed in conjunction with the latter upon ores which do not contain cyanicids. The manganese compound may be associated with the cyanid in other ways than by mixing it with the ore, notably by intimately mixing it with the cyanid solution so as to dissolve as much of it as possible therein before applying the cyanid to the ore.

The action of the manganese compound may be accelerated and perfected by the addition of the more easily reducible soluble oxygen-giving salts, such as nitrates, chlorates and the like, the amount of which may conveniently be very small in comparison with the manganese salt; in the case of a nitrate about 4 per cent. of the raw umber. The operation of the oxygen-giving salts in this connection may be distinguished from that of oxidizers employed with simple cyanid solutions; they appear to act as oxygen carriers to the manganese compound and are not decomposed in the ordinary sense of the term.

It is of course a matter of common knowledge that manganese dioxid, in the presence of acid, transforms ferrous salts into the ferric state, the manganese dioxid being converted into a soluble manganous salt. Such manganous salt is as detrimental to the extraction of gold, for instance, as a ferrous salt, but in the present process it is not produced.

The reactions which probably occur are as follows: First, in the presence of acid, manganous sulfate is formed, thus:—

If lime be added to precipitate the slimes, the manganous sulfate is converted into manganous oxid, which is more objectionable than the original FeO, thus:—

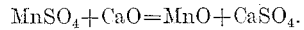

On the other hand, in the presence of water and alkali, as in the present invention, the sesquioxid of manganese is thought to be formed:—

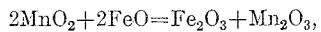

the FeO, of course, having been reduced from the sulfate by the lime or other alkali.

I claim as my invention:—

1. In the cyanid treatment of ores the process which consists in treating the ore in the presence of alkali with cyanid in association with a compound of manganese in which manganese dioxid occurs in a finely divided amorphous form.

2. In the cyanid treatment of ores the process which consists in treating the ore in the presence of alkali with cyanid in association with a compound of manganese in which manganese dioxid occurs in a finely divided amorphous form, and with an easily reducible soluble oxygen-giving salt.

3. In the cyanid treatment of ores, the process which consists in treating the ore in the presence of alkali, with a cyanid solution, in association with a manganese compound in which manganese dioxid occurs in a finely divided amorphous form.

In testimony whereof I affix my signature in presence of two witnesses.

ALFRED ADAIR.

Witnesses:
ALFRED L. SPOOR,
WM. HELLMAN VENCINT.